United States Patent
Mampe et al.

(10) Patent No.: US 7,415,131 B2
(45) Date of Patent: Aug. 19, 2008

(54) METHOD AND SYSTEM FOR IMAGE PROCESSING

(75) Inventors: John J. Mampe, Palm Coast, FL (US); Shahrom Kiani, Arlington, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 628 days.

(21) Appl. No.: 10/736,239

(22) Filed: Dec. 15, 2003

(65) Prior Publication Data

US 2004/0218783 A1  Nov. 4, 2004

Related U.S. Application Data

(60) Provisional application No. 60/436,339, filed on Dec. 24, 2002.

(51) Int. Cl.
G06K 9/00 (2006.01)
K07C 5/00 (2006.01)

(52) U.S. Cl. .................. 382/101; 209/546; 209/584

(58) Field of Classification Search ............. 382/101, 382/102, 190; 235/492; 209/584
See application file for complete search history.

(56) References Cited

U.S. PATENT DOCUMENTS

| | | | | |
|---|---|---|---|---|
| 4,632,252 A * | 12/1986 | Haruki et al. | .............. | 209/546 |
| 4,992,649 A * | 2/1991 | Mampe et al. | .............. | 209/546 |
| 5,031,223 A * | 7/1991 | Rosenbaum et al. | ........ | 382/101 |
| 5,216,725 A * | 6/1993 | McCubbrey | ................. | 382/12 |
| 5,311,999 A | 5/1994 | Malow et al. | .............. | 209/583 |
| 5,335,297 A | 8/1994 | Pullen | ......................... | 382/50 |
| 5,422,821 A | 6/1995 | Allen et al. | ................. | 364/478 |
| 5,558,232 A * | 9/1996 | Stevens et al. | .............. | 209/584 |
| 5,703,783 A | 12/1997 | Allen et al. | ........... | 364/478.01 |
| 5,751,843 A | 5/1998 | Maggioni et al. | ........... | 382/154 |
| 5,770,841 A * | 6/1998 | Moed et al. | ................. | 235/375 |
| 5,889,897 A | 3/1999 | Medina | ..................... | 382/310 |
| 5,974,147 A | 10/1999 | Cordery et al. | .............. | 380/25 |
| 6,014,450 A * | 1/2000 | Heilper et al. | ............. | 382/101 |
| 6,427,021 B1 * | 7/2002 | Fischer et al. | .............. | 382/101 |
| 6,487,302 B2 * | 11/2002 | Foley | ........................ | 382/102 |
| 6,741,724 B1 * | 5/2004 | Bruce et al. | ................. | 382/101 |
| 6,796,433 B2 * | 9/2004 | Daniels, Jr. et al. | ........ | 209/384 |
| 6,888,084 B1 * | 5/2005 | Bayer | ........................ | 209/584 |
| 6,909,789 B1 * | 6/2005 | Hänsel et al. | ............... | 382/101 |
| 6,977,353 B1 * | 12/2005 | Avant et al. | ................. | 209/546 |
| 7,136,504 B2 * | 11/2006 | Hansel et al. | .............. | 382/101 |
| 7,145,093 B2 * | 12/2006 | Mampe et al. | .............. | 209/584 |
| 2002/0168090 A1 | 11/2002 | Bruce et al. | ................. | 382/101 |
| 2004/0120547 A1 | 6/2004 | Mampe et al. | .............. | 382/101 |

* cited by examiner

Primary Examiner—Andrew W. Johns
Assistant Examiner—Andrae Allison

(57) ABSTRACT

The invention provides an improved method and system for processing mail items on bar code sorting machines. Such a method includes the steps of scanning a surface of each mail piece with at least one imaging camera to obtain at least one image of the surface represented by image data, analyzing the image data to locate a bar code in the image, and analyzing the bar code to recognize a first destination code. If the first destination code meets predetermined criteria, then the mail piece is processed further in a manner dependent on the first destination code. If the first destination code cannot be recognized or fails to meet the predetermined criteria, the image data is analyzed to locate destination address lines in the image, and the address lines are analyzed to determine a second destination code. The mail piece is sorted according to the second destination code, or a result determined by arbitrating the first and second destination codes.

17 Claims, 2 Drawing Sheets

METHOD AND SYSTEM FOR IMAGE PROCESSING

This application claims priority of U.S. Provisional Patent Application Ser. No. 60/436,339, filed Dec. 24, 2002.

TECHNICAL FIELD

The present invention relates to the automated processing of images, in particular to the scanning and processing of images of mail pieces to decode address and other information.

BACKGROUND OF THE INVENTION

Current state-of-the art postal letter mail equipment is divided into two types, those that primarily process addresses, and those that process mail that has been bar coded. Bar code processing equipment is simpler in design and does not require as long a transport belt path because the time to process a mail piece image is less for one containing a bar code than one containing only address information. Bar codes typically included on mail items are traditional linear bar code types as well as two dimensional code patterns that contain alphanumeric and ZIP code data.

Many efforts to improve bar code recognition have been employed to increase the effective yield of the machines to as high as 90%, but ultimately severely degraded images, or those wherein the bar code is obscured by an envelope's window edge, cause a certain percentage of mail items to be rejected. Mail items with bar codes that cannot be read are rejected and either processed manually or reprocessed on other equipment capable of reading the full address. These later steps result in additional costs and delay in processing the mail items, and depending upon the specific step of the production process, this can sometimes result in an extra day to deliver the item.

Some bar-coded mail items have an additional identification code used to associate an image with the mail item. These pieces had been previously processed and a sorting bar code applied by an OCR sorting system as deployed by the USPS, or by a mail processing companies that have equipment similar to the USPS and who are operating under license to the USPS. The ID code is read by a separate bar code reader and is used by the bar code sorters to enable each to query a central server for bar code equivalent data when sorting bar codes cannot be read. The server receives the bar code equivalent data, i.e., data from which a correct destination bar code for that mail piece can be determined, from a process such as video coding. A need persists for a system able to provide a higher read success rate for bar code sorters.

SUMMARY OF THE INVENTION

The invention provides an improved method and system for processing mail items on bar code sorting machines. Such a method includes the steps of:

(a) scanning a surface of each mail piece with at least one imaging camera to obtain at least one image of the surface represented by image data;

(b) analyzing the image data to locate a bar code in the image;

(c) analyzing the bar code to recognize a first destination code;

(d) if the first destination code meets predetermined criteria, then processing the mail piece further in a manner dependent on the first destination code; and (e) if the first destination code cannot be recognized or fails to meet the predetermined criteria, then analyzing the image data to locate destination address lines in the image, analyzing the address lines to determine a second destination code, and processing the mail piece further in a manner dependent on one of the second destination code, or a result determined by arbitrating the first and second destination codes.

These steps are generally executed on a mail sorting machine which may be equipped with one or two imaging cameras or scanners. If two cameras are present, then step (a) contemplates that one image can be made to locate the bar code and another to locate destination address lines. In the alternative, a single image can be analyzed using known region of interest strategies to obtain both the destination address lines image data and the bar code image data. The process of arbitration, described further below, is optional. In the simplest embodiment of the invention, if the bar code does not adequately give the destination code (unreadable, outdated, or only gives part of the code), then the second destination code is used to determine how the item is sorted or otherwise processed. If both the bar code and address lines prove unreadable, the mail item is a reject.

The invention further provides an apparatus for sorting a series of mail pieces according to the method set forth above. Such an apparatus includes a conveyor which transports a series of mail pieces, generally a pair of upright belts holding each mail piece from either side for transport on edge. The conveyor ultimately conveys each mail piece to a series of diverters which are each operable to divert mail pieces from the conveyor to one of a series of sorting destinations, e.g., bins or slots. An imaging camera is positioned proximate the conveyor for scanning a surface of each mail piece to obtain an image of the surface represented by image data. A computerized control system analyzes the image data to locate a bar code in the image and analyzes the bar code to recognize a first destination code. If the first destination code meets predetermined criteria, the control system sorts the mail piece by actuating one of the diverters in a manner dependent on the first destination code. If the first destination code cannot be recognized or fails to meet the predetermined criteria, the system then analyzes the image data to locate destination address lines in the image, analyzes the address lines to determine a second destination code, and sorts the mail piece by actuating one of the diverters in a manner dependent on one of the second destination code, or a result determined by arbitrating the first and second destination codes. These steps can be carried out by any appropriate combination of hardware and software.

These and other aspects of the invention are further described and discussed in the detailed description which follows.

BRIEF DESCRIPTION OF THE DRAWING

In the accompanying drawing, wherein like numerals represent the same or similar elements throughout.

DETAILED DESCRIPTION

Optical character reader (OCR)-assisted bar code reading (BCR) according to the invention can provide recognition of the address and other text and pattern information on the mail piece for subsequent sortation to the correct machine pocket. Significant performance improvements on the remaining bar code rejects can be gained utilizing this method. A computer processor is used to implement the OCR and pattern recognition on the traditional bar code sorting machines (a total of over 8,000 USPS bar code sorters, including Delivery Point Bar Code Sorters-DBCS, Carrier Sequencing Bar Code Sorters-CSBCS and Delivery Input Output Sub Systems-DIOSS). The existing sorter system computer is augmented with an OCR/pattern recognition computer. This computer performs the traditional bar code reading function. OCR and text pattern recognition software processes are initiated for those mail pieces that have no bar code (i.e. bar code slipped behind the window) or have an unreadable bar code, thereby providing additional read performance for mail items that do not contain a bar code or contain unreadable or damaged bar codes.

Figure 1:
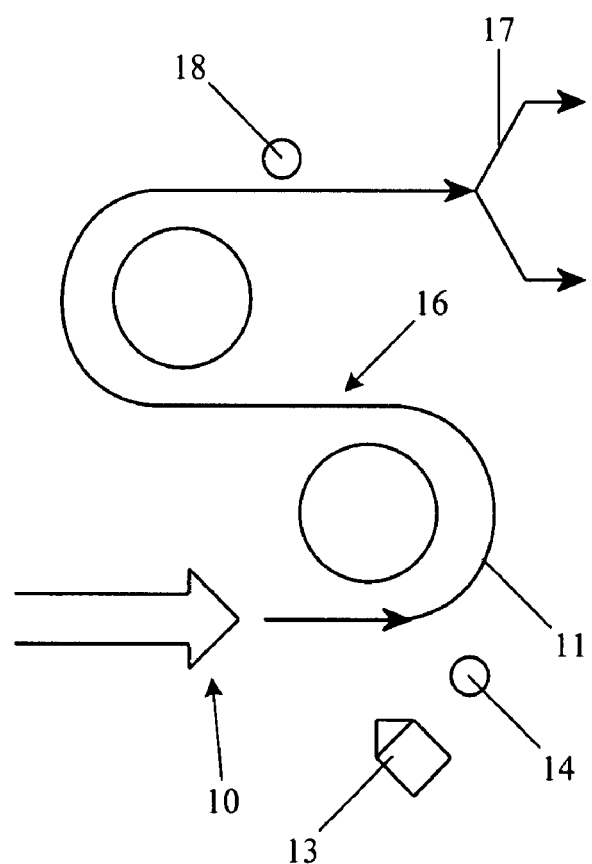
FIG. 1 is a typical sorting machine elevator section which can be used in the invention.
Figure 2:
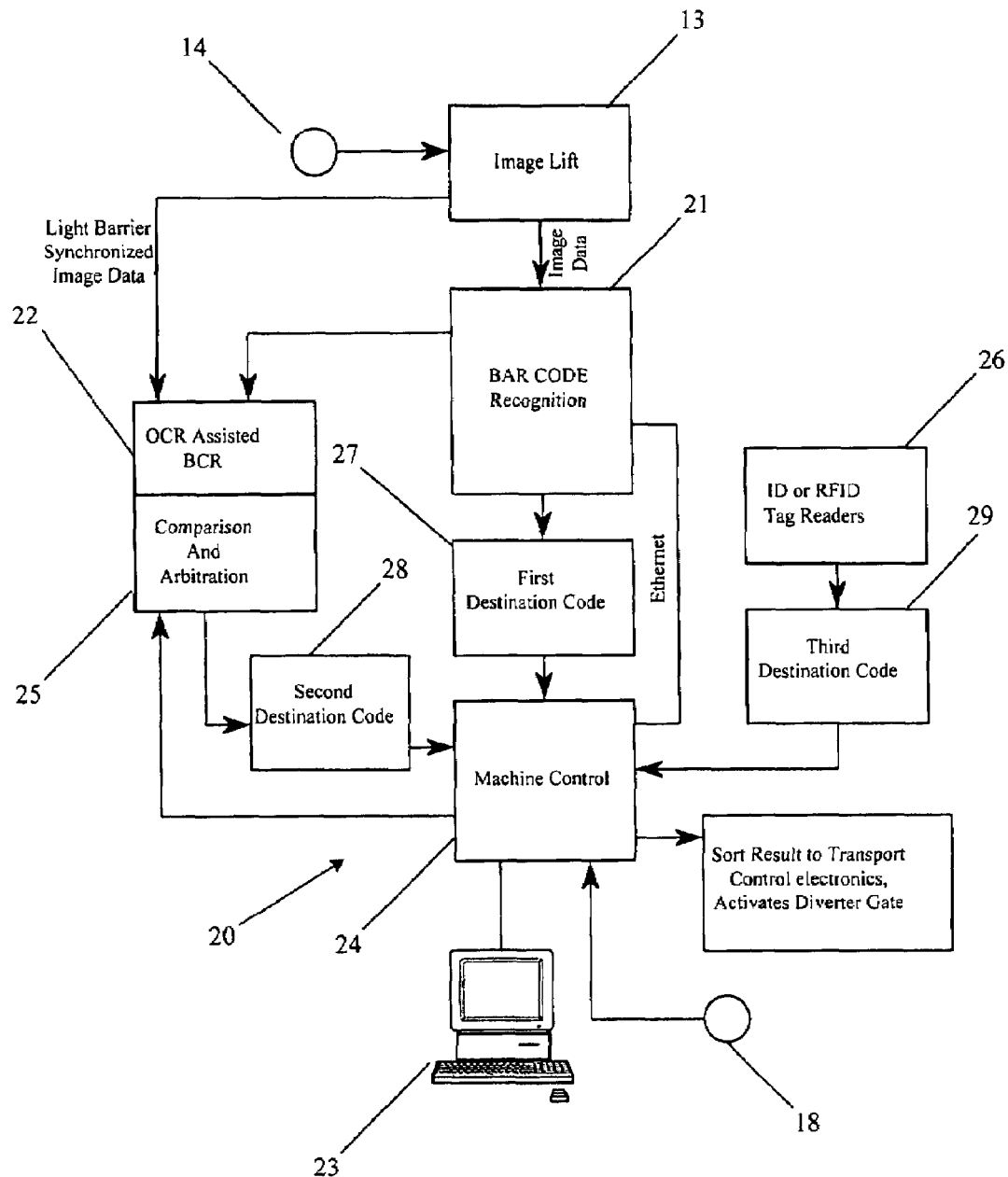
FIG. 2 is a schematic diagram of a system for scanning mail pieces according to the invention.

Referring to FIGS. 1 and 2, a system 10 according to the invention includes a paired belt conveyor 11 which is part of a postal sorting machine. At the sorting machine elevator section shown in FIG. 1, mail carried by conveyor 11 passes by a wide field of view digital camera 13. Camera 13 captures an image of the mail piece surface that will be analyzed for address information in accordance with the invention. Immediately after scanning, each mail piece passes by a first photo cell or light barrier 14 and enters an idler section 16 of the conveyor that leads to the diverter gates 17. In typical bar code sorting machines used in the U.S. postal system, first photo cell 14 is located some distance from the first mail path diverter gate 17 that separates mail streams into different levels. In this implementation, the time from photo cell 14 to a second diverter gate photo cell 18 can be utilized for arbitration of differing results and returning the best ZIP code and sort decision result. In this implementation, in other words, the additional latency time is utilized for processing. This would not be possible with a standard configuration that requires the bar code reader output results at a fixed time interval.

The output of the image lift camera 13 is passed to both bar code recognition 21 and OCR recognition 22 process modules which form part of the control system 20. Output from photocell 14 is provided to image lift camera 13 for transfer to the bar code recognition module 21 for synchronization with the bar code recognition process and also to the OCR recognition module 22 to assure that the OCR process is synchronized with results that are determined by the bar code recognition process. Numerous methods of can be employed for synchronizing these data such as time stamping the output, optical encoder counts, or other methods that are well known in the art. Both bar code and OCR processes 21, 22 can be initiated in parallel with the acquisition of the image data. Alternatively, either process can await suitable portions of the image information to be delivered prior to beginning process execution. Processes 21, 22 are embodied in program logic that can be run as multiple tasks on a single computer, or multiple computers or processors may be provided.

Bar code recognition normally completes execution sooner than OCR recognition. The results of this process are provided as a first destination code 27 to the machine controlmodule 24, operable from a user terminal 23, which determines the destination sort location for the item represented by the image. This result is buffered to await the OCR process resolution, or an interrupt from the sort decision second photocell 18 that informs machine control 24 that a decision must be provided. Occasionally, the result from the bar code decision process 21 is that there is no valid result and subsequent sort decision.

"Buffering" as used in the present invention refers to the process of maintaining in computer memory or storing to a computer storage medium data a series of data elements, such as images captured from a device such as a camera or scanner. Generally the buffer will contain such data long enough for an intended purpose, such as decoding, to be completed. At typical sorting speeds, 10 or so mail pieces may be in the process of being transported between photocells 14 and 18. The computer memory buffer maintains image data for these mail pieces in order of arrival, and the processes described are carried on simultaneously for each of the mail pieces then in transit. Data is dropped from the buffer, if not saved for later reference, once the associated mail piece passes by the second photocell 18.

When the OCR decision data are received from the OCR process as a second destination code 28, the data are compared with the bar code decision data for the same mail piece. An arbitration process 25 determines which result to use and provides that output to machine control. Machine control 24 can also provide a result to OCR process 22 to inform it that a successful bar code result has been received. Depending upon the system resources then available, the OCR module 22 can terminate processing on the appropriate image, or continue to completion. If resources for processing a subsequent image are marginal or low, this feature enables stopping processing on one image to reallocate resources (memory or machine cycles) to work on a subsequent one.

In some systems, such as DIOSS machines, the machine is also provided with an bar code ID tag or RFID tag reader 26. These devices permit the machine to read ID codes off of a mail piece previously determined to be unreadable in a postal sorting process. The mail piece was ID tagged and diverted for human review (video coding) so that a valid address and destination code could be determined. When such a tag is detected, control module 24 receives a third destination code 29 and consults an external database wherein the results of video coding are correlated with ID codes. The destination ZIP code to be used for sorting or other processing is then the one matching the ID tag, which would override any result determined by OCR or bar code processes 21, 22.

If idler section 16 is sufficiently long and sufficient computing resources are available, it is preferred according to the invention for the results from processes 21, 22 to be processed by arbitrator module 25. "Arbitration" in postal processing refers generally to software (program logic) that compares results from two different, usually parallel processes and decides which to use based on predetermined criteria or selection rules. Arbitration can also involve combining information from two or more upstream processes to reach a result most likely to be accurate. In the process of the present invention, arbitration is not normally needed if, as in a majority of cases, the destination bar code is fully readable (to eleven digits in the case of a ZIP code.) Arbitration may be needed where the results from processes 21, 22 return a different number of digits, for example, the bar code is readable to 5 or 7 digits but the OCR process results in 11 digits. If the first 5 or 7 digits of the OCR process match the bar code result, the arbitration rules might then dictate that the 11 digit result be used. Arbitration can also be used in the event that the bar code is readable but proves to be invalid, outdated or incorrect to minimize sorting on such bar codes. The result of arbitration is sent to control module 24 and is used as the basis for further processing. The rules for arbitration are determined in advance according to user preference.

As noted above, the bar code recognition process 21 and OCR process 22 may run in parallel. For example, OCR process 22 works on locating the address coordinates and location of the address lines while bar code process 21 decodes the bar code. If bar code recognition is not successful, or if the bar code does not meet predetermined criteria, then process 22 continues to determine the destination ZIP Code and other address data. In the alternative, time permitting, the start of process 22 is delayed until process 21 is completed and a bar code that does not meet the conditions for validity (e.g., unreadable, not enough digits, obsolete or invalid) has been detected. Upon completion of process 22, the destination address is converted into bar code equivalent data, that is, a delivery code such as a ZIP code. This may require reference to a master database of addresses and associated delivery codes, as in a case where the address can be read but no zip code is provided or only a 5-digit zip code is provided.

Figure 3:
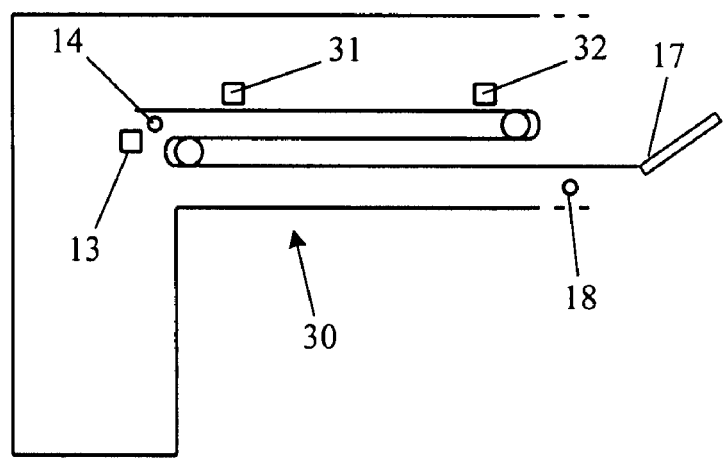
FIG. 3 is a schematic diagram of an alternative apparatus according to the invention.

According to another aspect of the invention, an ID tag may be applied to mail pieces for which processes 21 and 22 fail to result in a destination code enabling a sorting decision. This is the starting end of the process discussed above wherein previously applied ID or radiofrequency ID tags are read. As shown in FIG. 3, in an alternative embodiment of the invention, a DIOSS machine 30 includes an ID tagger 31 downstream from camera 13, preferably a sufficient distance so that a decision can be made concerning each mail piece before it passes tagger 31. An ink jet printer 32 then prints the scannable ID code on to the mail piece, and the mail piece enters a drying loop 33 before it reaches the first diverter gate 17. The control computer stores the image data indexed to the I) number in a storage medium (e.g., hard drive) for later retrieval. The OCR results, such as a partial address, may also be stored for later review, indexed to the same ID number. The mail piece is then sorted to a reject bin for subsequent processing, such as video coding. Once video coded, the mail piece can then be reintroduced to a sorter equipped with an ID tag reader as described above.

Use of the systems and processes of the invention can improve read rates on currently deployed bar code sorters by from 1 to 3 percent, resulting in large cost savings without any significant changes to the postal processing equipment. Although various embodiments of the invention have been illustrated in the accompanying drawings and described in the foregoing detailed description, it will be understood that the invention is not limited to the embodiments disclosed but, as will be appreciated by those skilled in the art, is susceptible to numerous modifications and variations without departing from the spirit and scope of the invention as hereinafter claimed.

The invention claimed is:

1. A method of sorting a series of mail pieces, comprising the steps of:
   (a) conveying a series of the mail pieces on a conveyor having a pair of upright belts holding each mail piece from either side for transport on edge and scanning a surface of each mail piece with at least one imaging camera to obtain at least one image of the surface represented by image data;
   (b) analyzing the image data to locate a destination bar code in the image;
   (c) analyzing the bar code to recognize a first destination code;
   (d) if the first destination code meets predetermined criteria, then sorting the mail piece to one of the sorting destinations in a manner dependent on the first destination code;
   (e) if the first destination code cannot be recognized or fails to meet the predetermined criteria, then analyzing the image data to locate destination address lines in the image, analyzing the address lines to determine a second destination code, and sorting the mail piece to one of a series of sorting destinations in a manner dependent on the second destination code, or a result determined by arbitrating the first and second destination codes; and
   (f) carrying out steps (a) to (e) concurrently for more than one mail piece at a time as the mail pieces are moving on the conveyor, wherein the conveyor transports the mail pieces past a series of diverters used for sorting the mail pieces to the sorting destinations, and completing steps (a) to (e) for each mail piece before each mail piece reaches a first one of the diverters.

2. The method of claim 1, wherein at least about 1% of mail pieces processed are sorted based on the second destination code.

3. The method of claim 1, wherein when a mail piece destination cannot be sufficiently identified from either the first or second destination codes, the method further comprises:
   creating a scannable identification code on the mail piece surface;
   storing the scanned image of the mail piece in computer accessible form together with the associated identification code; and
   sorting the mail piece to a reject bin for unreadable mail pieces.

4. The method of claim 1, further comprising:
   determining if the mail piece bears an ID tag associated with that mail piece in previous postal processing;
   if such an ID tag is identified, retrieving a third destination code associated with the identification code from a computer accessible storage medium; and
   sorting the mail piece based on the retrieved third destination code.

5. The method of claim 1, further comprising buffering the image data in a computer memory as one of a series of images for successive mail pieces.

6. The method of claim 1, further comprising carrying out step (e) only upon completion of steps (b) thru (d) when the first destination code cannot be recognized or fails to meet the predetermined criteria.

7. The method of claim 1, further comprising initiating step (e) in parallel with steps (b) thru (d).

8. The method of claim 7, further comprising:
   terminating step (e) when it is determined that the first destination code meets the predetermined criteria; and
   continuing step (e) to completion when the first destination code cannot be recognized or fails to meet the predetermined criteria.

9. The method of claim 1, wherein step (e) further comprises:
   analyzing the image data to determine if an ID tag other than a bar code or address lines, associated with a destination is present;
   if such a data pattern is present, determining a corresponding third destination code for the destination associated with the ID tag; and
   processing the mail piece further in a manner dependent on the third destination code.

10. The method of claim 1, wherein step (e) further comprises printing a bar code on the mail piece, which bar code embodies a scannable destination code which is the second destination code or the result determined by arbitrating the first and second destination codes.

11. The method of claim 1, further comprising
scanning a surface of each mail piece with a first imaging camera to obtain a first image of the surface represented by first image data;
scanning the surface of each mail piece with a second imaging camera to obtain a second image of the surface represented by second image data;
carrying out steps (b)-(d) using the first image data; and
carry out step (e) using the second image data.

12. An apparatus for sorting a series of mail pieces, comprising:
a conveyor having a pair of upright belts holding each mail piece from either side for transport on edge. which conveyor transports a series of mail pieces;
a series of diverters which are each operable to divert mail pieces from the conveyor to one of a series of sorting destinations;
an imaging camera positioned proximate the conveyor for scanning a surface of each mail piece to obtain an image of the surface represented by image data; and
a computerized control system for analyzing the image data to locate a destination bar code in the image, analyzing the bar code to recognize a first destination code, if the first destination code meets predetermined criteria, then sorting the mail piece by actuating one of the diverters in a manner dependent on the first destination code, and if the first destination code cannot be recognized or fails to meet the predetermined criteria, then analyzing the image data to locate destination address lines in the image, analyzing the address lines to determine a second destination code, and sorting the mail piece by actuating one of the diverters in a manner dependent on the second destination code, or a result determined by arbitrating the first and second destination codes, wherein the computerized control system completes the foregoing steps before the mail piece reaches a first one of the diverters.

13. The apparatus of claim 12, further comprising:
a first sensor located proximate the conveyor and imaging camera able to sense a mail piece passing by;
a second sensor located proximate the conveyor and upstream from a first one of the diverters; and
wherein the computerized control system further comprises means for terminating processing of image data and providing a sorting decision when a mail piece detected by the first sensor is then detected by the second sensor.

14. The apparatus of claim 13, wherein the sensors are photocells.

15. The apparatus of claim 13, wherein the computerized control system further comprises a memory buffer for storing image data from a plurality of mail pieces in transit between the first and second sensors.

16. The apparatus of claim 12, wherein the series of sorting destinations comprises a row of bins or slots each having an associated divert gate, and the imaging camera is located upstream from a first one of the diverters by a distance sufficient to allow the computerized control system to complete analyzing the image data before the mail piece reaches the first one of the diverters.

17. The method of claim 1, wherein the series of sorting destinations comprises a row of bins or slots each having an associated divert gate.

* * * * *